United States Patent
Beckman

(10) Patent No.: US 8,410,639 B2
(45) Date of Patent: *Apr. 2, 2013

(54) ELECTRONIC LEAKAGE REDUCTION TECHNIQUES

(75) Inventor: Christopher V. Beckman, New York, NY (US)

(73) Assignee: Loughton Technology, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,366

(22) Filed: Aug. 15, 2011

(65) Prior Publication Data

US 2011/0298303 A1    Dec. 8, 2011

Related U.S. Application Data

(63) Continuation of application No. 12/888,410, filed on Sep. 22, 2010, now Pat. No. 7,999,415, and a continuation of application No. 11/806,083, filed on May 29, 2007, now Pat. No. 7,821,161.

(60) Provisional application No. 60/808,814, filed on May 27, 2006.

(51) Int. Cl.
*H01H 47/00* (2006.01)

(52) U.S. Cl. ........................... 307/126; 307/135

(58) Field of Classification Search ............ 307/125, 307/126, 135, 140; 361/93.7, 42, 160, 166, 361/169.1; 700/296, 291; 702/62; 50/520; 324/142, 141

See application file for complete search history.

(56) References Cited

U.S. PATENT DOCUMENTS

| | | | |
|---|---|---|---|
| 1,859,492 A | 5/1932 | Balestra |
| 2,577,114 A | 12/1951 | Eames |
| 3,019,548 A | 2/1962 | Nadler |
| 3,104,490 A | 9/1963 | Cornell |
| 3,343,774 A | 9/1967 | Pryor |
| 4,391,427 A | 7/1983 | Foresman |
| 4,418,333 A | 11/1983 | Schwarzbach et al. |
| 4,611,295 A | 9/1986 | Fowler |
| 4,775,124 A | 10/1988 | Hicks |
| 4,782,420 A | 11/1988 | Holdgaard-Jensen |
| 4,993,546 A | 2/1991 | Southard |
| 5,020,753 A | 6/1991 | Green |
| 5,029,802 A | 7/1991 | Ali |
| 5,181,606 A | 1/1993 | Martell |

(Continued)

OTHER PUBLICATIONS

Internet Archive Wayback Machine, disclosing site retrieval for http://lexisnexis.com in 2005, 1 page.

(Continued)

*Primary Examiner* — Shawn Riley
(74) *Attorney, Agent, or Firm* — Stolowitz Ford Cowger LLP

(57) ABSTRACT

Electronic leakage reduction techniques are provided, whereby a device is configured to detect characteristics of an appliance and its power supply when the appliance is off or otherwise placed in a mode for reduced power use by said appliance, and whereby voltage and power provided to the appliance are then substantially reduced. In other aspects of the invention, user behavior may also manually control power delivered to the appliance, for example, with a switch. In still other aspects of the invention, a device is configured to detect characteristics of an appliance and its power supply when the appliance is on or otherwise placed in a mode for higher power use by said appliance, and increases power to the appliance.

52 Claims, 4 Drawing Sheets

U.S. PATENT DOCUMENTS

| | | | |
|---|---|---|---|
| 5,368,268 | A | 11/1994 | Jodwischat |
| 5,417,397 | A | 5/1995 | Harnett |
| 5,642,871 | A | 7/1997 | Repert |
| 5,680,929 | A | 10/1997 | Von Seidel |
| 6,152,294 | A | 11/2000 | Weinberg |
| 6,340,864 | B1 | 1/2002 | Wacyk |
| 6,396,166 | B1 | 5/2002 | Kim |
| 6,552,888 | B2 | 4/2003 | Weinberger |
| 6,828,695 | B1 | 12/2004 | Hansen |
| 6,956,593 | B1 | 10/2005 | Gupta et al. |
| 6,957,233 | B1 | 10/2005 | Beezer et al. |
| 6,966,445 | B2 | 11/2005 | Johanna |
| 6,992,687 | B1 | 1/2006 | Baird et al. |
| 7,020,663 | B2 | 3/2006 | Hay et al. |
| 7,181,679 | B1 | 2/2007 | Taylor |
| 7,234,104 | B2 | 6/2007 | Chang et al. |
| 7,257,774 | B2 | 8/2007 | Denoue et al. |
| 7,388,735 | B2 | 6/2008 | Chen |
| 7,411,317 | B2 * | 8/2008 | Liu .................. 307/112 |
| 7,418,656 | B1 | 8/2008 | Petersen |
| 7,447,771 | B1 | 11/2008 | Taylor |
| 7,505,237 | B2 | 3/2009 | Baxter |
| 7,506,246 | B2 | 3/2009 | Hollander et al. |
| 7,594,187 | B2 | 9/2009 | Baird et al. |
| 7,800,251 | B2 * | 9/2010 | Hodges et al. ........... 307/126 |
| 7,821,161 | B2 | 10/2010 | Beckman |
| 7,859,539 | B2 | 12/2010 | Beckman |
| 7,889,464 | B2 | 2/2011 | Chen et al. |
| 7,999,415 | B2 | 8/2011 | Beckman |
| 8,000,074 | B2 * | 8/2011 | Jones et al. ............ 361/93.1 |
| 8,004,123 | B2 * | 8/2011 | Hodges et al. ........... 307/126 |
| 8,006,387 | B2 * | 8/2011 | Watts et al. ............ 29/897.312 |
| 2003/0050927 | A1 | 3/2003 | Hussam |
| 2005/0055405 | A1 | 3/2005 | Kaminsky et al. |
| 2005/0066069 | A1 | 3/2005 | Kaji |
| 2005/0182973 | A1 | 8/2005 | Funahashi et al. |
| 2005/0193188 | A1 | 9/2005 | Huang |
| 2006/0107062 | A1 | 5/2006 | Fauthoux |
| 2006/0163344 | A1 | 7/2006 | Nwosu |
| 2006/0173819 | A1 | 8/2006 | Watson |
| 2006/0176146 | A1 | 8/2006 | Krishah et al. |
| 2006/0273663 | A1 * | 12/2006 | Emalfarb .................. 307/126 |
| 2007/0006322 | A1 | 1/2007 | Karimzadeh et al. |
| 2007/0016941 | A1 | 1/2007 | Gonzalez et al. |
| 2007/0045417 | A1 | 3/2007 | Tsai et al. |
| 2008/0086680 | A1 | 4/2008 | Beckman |
| 2008/0092219 | A1 | 4/2008 | Beckman |

OTHER PUBLICATIONS

Lexis Nexis, "LexisNexis Citation Tools 2001", copyright 2002, LexisNexis, p. 1-8. (discloses checking citations for positive and negative treatments).

LexisNexis, "Shepard's Citations Review", Apr. 30, 2004, p. 1-2.

LexisNexis, "Shepard's Citations Service", copyright 2003, p. 1-2.

Calhoun et al., "Standby Voltage Scaling for Reduced Power"; Dec. 19, 2002.

Stolowitz Ford Cowger LLP, Listing of Related Cases, Jan. 12, 2012.

SVT Technologies, "SVT Lighting Control Products", May 4, 2006; http://www.svt-tech.com/lightingcontrol.html.

California Energy Commission, "Small Appliances", Mar. 6, 2001; http://www.consumerenergycenter.org/homeandwork/homes/inside/appliances/small.html.

Energyrating.gov.au, "The Leaking Electricity Initiative: an International Action to Reduce Standby Power Waste of Electrical Equipment", Jul. 9, 2005; http://www.energyrating.gov.au/library/pubs/cop5-leaking.pdf.

Bits Limited, "The Leg3", Jan. 1, 2007; http://catalog.bitsltd.us/catalog/SMART/LEG3.html.

Stolowitz Ford Cowger LLP List of Related Cases. Prepared Jan. 12, 2012.

* cited by examiner

ELECTRONIC LEAKAGE REDUCTION TECHNIQUES

CROSS REFERENCE TO RELATED APPLICATION

This application is a continuation of U.S. patent application Ser. No. 12/888,410, now U.S. Pat. No. 7,999,415, filed Sep. 22, 2010 the entire disclosure and references of which are incorporated herein by reference; U.S. Pat. No. 7,999,415 is a continuation of U.S. patent application Ser. No. 11/806,083, now U.S. Pat. No. 7,821,161, filed May 29, 2007, the entire disclosure and references of which are hereby incorporated by reference herein; and U.S. Pat. No. 7,821,161 also claims the benefit of U.S. Provisional application No. 60/808,814, filed May 27, 2006, the entire disclosure and references of which are incorporated herein by reference.

FIELD OF THE INVENTION

The present invention relates to techniques for reducing electronic leakage from appliances and modified electrical outlets.

BACKGROUND OF THE INVENTION

A wide variety of electrically-powered appliances are known to draw electrical current, using electrical power, even when "switched off," meaning that the appliance is placed in a relatively inactive and unused state by the user, usually by pushing a "power" button or switching a power switch to an "off" position. (These buttons are often labeled with the symbol: ⏻, or a similar symbol.) The power consumed by appliances that are "switched off," known as power "leakage," is a matter of growing public concern because the associated unnecessary use of power is tremendously wasteful of economic resources, especially in the aggregate, and contributes to the creation of atmospheric pollution associated with the production of the wasted power at plants that expel pollution, including greenhouse gasses. See generally California Energy Commission, report available at http://www.consumerenergycenter.org/homeandwork/homes/inside/appliances/small.html.; see also http://www.energyrating.gov.au/library/pubs/cop5-leaking.pdf.

PRIOR ART

Prior art has addressed the problem of leakage through "Smart Switches" built into, or retrofitted to, individual appliances, such that an appliance draws little or no current upon pressing a power button, or flipping a power switch. See generally http://www.energyrating.gov.au/library/pubs/cop5-leaking.pdf. Similarly, one may simply unplug an appliance, or switch off a "hard switch" which totally breaks an electric circuit, preventing further leakage. Another invention addresses the problem of leakage by enabling the electrical utility company to control outlets at each and all homes of the individual consumer, to reduce their "draw" at critical times of power shortage. See U.S. Pat. No. 6,828,695, "System, Apparatus and Method for Energy Distribution Monitoring and Control and Information Transmission." Yet another invention addresses leakage through a "smart" power strip, with one or more outlets designated as "control," "master" or "hot," which is constantly powered, but also monitored for current usage, and other "slave" outlets on the strip that are switched off when an appliance attached to the "control" outlet is "turned off." That invention is intended for systems, such as a computer, computer screen, computer-associated printer, etc, where the consumer may wish for all associated devices to be switched off at once, when the computer, for example, is switched off.

Some Disadvantages of the Prior Art

The latter invention discussed above does not address the problem of leakage from the "control,"/"master"/"hot" appliance, which will still draw power while the associated peripheral appliances are switched off. Similarly, that invention does not apply to devices that are individually turned on and off because the consumer does not wish to necessarily associate their use and disuse with some other "master" or "control" appliance. In addition, such Smart Switches integrated in newer appliances address the problem of leakage on an ongoing basis, but do not address the problem of leakage in the vast majority of existing appliances. Although a consumer may always unplug or otherwise manually break the circuit, as with a finger-actuated power strip switch, that solution requires perpetual consideration and perseverance on the part of the individual consumer. In practice, the vast majority of individual consumers leave their appliances plugged in, and leaking power, even when aware of the problem of leakage.

SUMMARY OF THE INVENTION

Electronic leakage reduction techniques are provided. In one aspect of the invention, an electrical power outlet with a programmable computing unit and means for reducing power to appliances detects whether said appliance is in "the off position," and reduces voltage to the appliance, and then monitors the level of power drawn by the appliance to determine when the appliance is in the "on position," and restores the "original operational voltage" to the appliance. More specifically, the electrical power outlet including a programmable computing unit delivers a "selected voltage below the original operational voltage" to the appliance while the appliance is in the off position, while testing the level or pattern of power, current or resistance, and restoring the original operational voltage to the appliance when said levels or patterns match the state of the appliance in the on position. Alternatively, the electrical power outlet including a programmable computing unit may deliver a particular voltage for particular durations at particular intervals to the appliance while the appliance is in the "off position," while testing the level or pattern of power, current or resistance, and restoring the original operational voltage to the appliance when said levels or patterns match the state of the appliance in the on position.

The following definitions apply to the remainder of this application:

"The off position" means that action with respect to an electrical appliance, such as switching a main power switch on the appliance to the "off" position, prescribed by the manufacturer or user for reducing power consumption by the appliance, has taken place without subsequent action prescribed by the manufacturer or user for returning the appliance to the "on" position.

"The on position" means that action with respect to an electrical appliance, such as switching a main power switch on the appliance to the "on" position, prescribed by the manufacturer or user for increasing power consumption by the appliance, has taken place, without subsequent action prescribed by the manufacturer or user for returning the appliance to "the off position."

"Original operational voltage" means the voltage or range of voltages applied to an appliance at which the appliance is operated, according to manufacturer's specifications or customary usage by consumers.

"Selected voltage below the original operational voltage" means a voltage below the original operational voltage and at which a level of power, resistance or current of the appliance can be identified as relating to the appliance in the on position.

"Pattern of current drawn by an electrical appliance" means a set of more than one level of current in an appliance occurring at particular timed intervals.

"Pattern of resistance of an electrical appliance" means a set of more than one level of resistance in an appliance occurring at particular timed intervals.

"Pattern of power drawn by an electrical appliance" means a set of more than on level of power in an appliance occurring at particular timed intervals.

DETAILED DESCRIPTION OF THE DRAWINGS

Figure 1:
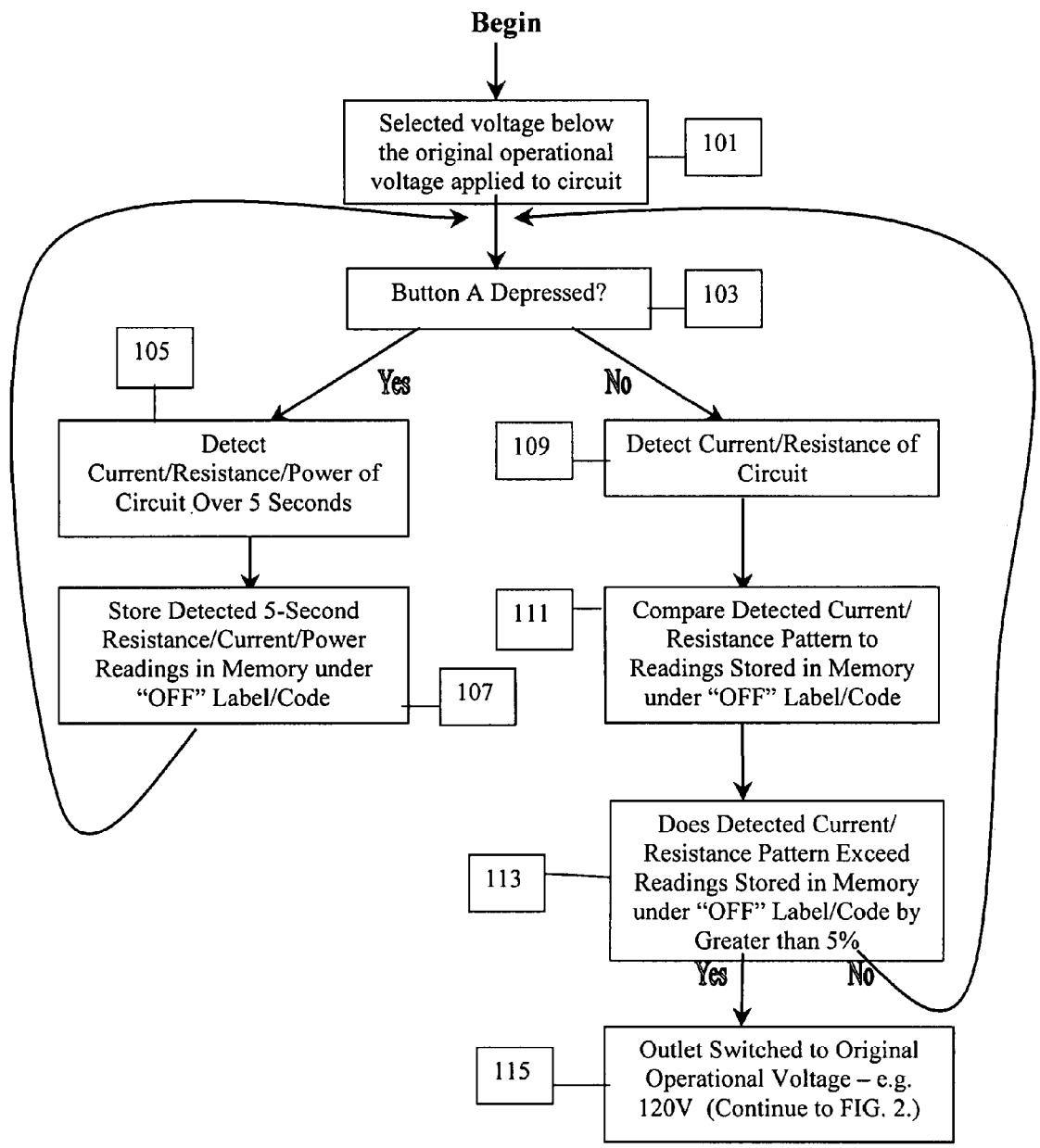
FIG. 1 is a diagram illustrating exemplary programming and methodology for a programmable unit of a preferred embodiment of the invention, for a mode in which a selected voltage below the original operational voltage is applied to an appliance.

FIG. 1 is a diagram illustrating exemplary programming and methodology for a programmable unit of a preferred embodiment of the invention, for a mode in which a selected voltage below the original operational voltage is applied to an appliance. In step 101, a selected voltage, below the original operational voltage for the appliance, is applied to the appliance. As explained above, a selected voltage below the original operational voltage means a voltage below the original operational voltage and at which a level of power, resistance or current of the appliance can be identified as relating to the appliance in the on position. By applying a selected voltage below the original operational voltage to an appliance, greatly reduced power consumption due to "leakage," defined as power consumed by the appliance while the appliance is in the off position, can be achieved while monitoring the appliance for an indication that the user intends to return the appliance to the on position, which signs may include an increased electrical resistance, lower current, increased power, or a pattern of resistance, pattern of current or pattern of power associated with the electrical appliance in either or both of the on or off positions. Alternatively, a particular voltage may be applied for particular durations at particular intervals, while still falling within the scope of the invention. That alternative may be more useful where the on position or off position is more difficult to determine with respect to an appliance at lower voltages, and the resistive, power and/or current-drawing characteristics of the appliance in the on position or off position do not vary widely over time or vary according to a pattern that can be detected at said particular intervals and particular durations. In step 103, said preferred embodiment of this invention determines whether a programming button, A, is depressed by the user, which would indicate that the user intends to indicate to the programming unit of the invention that the appliance is in the off position. If button A is depressed, the programming unit proceeds to step 105, in which the programming unit detects, with the assistance of a sensor or sensors, the level or pattern of power drawn by the appliance, electrical resistance of the appliance or current drawn through the circuit made by the appliance and power outlet. It is within the scope of this invention that any of those three described electrical characteristics of the appliance may be detected and recorded. In step 107, the programming unit then records in a memory unit either the average level of power or pattern of power over a set time interval, shown as 5 seconds in FIG. 1, under a code identifying those recordings as recordings of the electrical characteristics of the appliance in the off position. It is also possible for the programming unit to record levels or patterns of electrical resistance of the appliance or current through the appliance/outlet circuit and accomplish the aims of the present invention. At that point, the programming unit returns to step 101. If, at step 103, the programming unit determines that button A is not depressed, the programming unit proceeds to step 109 and detects, with a sensor, the present levels or patterns of power drawn by the appliance, electrical resistance of the appliance or current drawn through the circuit made by the appliance and power outlet. In step 111, the programming unit compares the present levels or patterns of power drawn by the appliance, electrical resistance of the appliance or current drawn through the circuit made by the appliance and power outlet with levels or patterns recorded in the memory unit during step 107. In step 113, the programming unit then determines whether the present levels or patterns of power drawn by the appliance, electrical resistance of the appliance or current drawn through the circuit made by the appliance and power outlet match levels or patterns recorded in the memory unit during step 107. It is within the scope of this invention that there may be a confidence interval, which indicates an amount of deviation between the present levels or patterns of power drawn by the appliance, electrical resistance of the appliance or current drawn through the circuit made by the appliance and levels or patterns recorded in the memory unit during step 107. It is also within the scope of this invention that such a confidence interval may be set by the user. Such a confidence interval may be set by establishing minimum or maximum levels of electrical power drawn by the appliance, resistance of the appliance or current passing through the appliance/outlet circuit after which a match will be determined. Such a step may be accomplished through any number of programming and user interfaces which will be readily apparent to those with skill in the art. If, in step 113, the programming unit determines that the present levels or patterns of power drawn by the appliance, electrical resistance of the appliance or current drawn through the circuit made by the appliance and power outlet match levels or patterns recorded in the memory unit during step 107, the programming unit returns to step 101. If, by contrast, in step 113, the programming unit determines that the present levels or patterns of power drawn by the appliance, electrical resistance of the appliance or current drawn through the circuit made by the appliance and power outlet do not match levels or patterns recorded in the memory unit during step 107, the programming unit will cause the restoration of original operational voltage to the appliance, and discontinuation of delivery of the selected voltage below the original operational voltage. This may be accomplished by the programming unit sending a signal to a relay connected to the outlet/appliance circuit. As discussed above, the original operational voltage means the voltage or range of voltages applied to an appliance at which the appliance is operated, according to manufacturer's specifications or customary usage by consumers. Typically, in the United States, the original operational voltage for an appliance is 120 volts, at the outlet.

Figure 2:
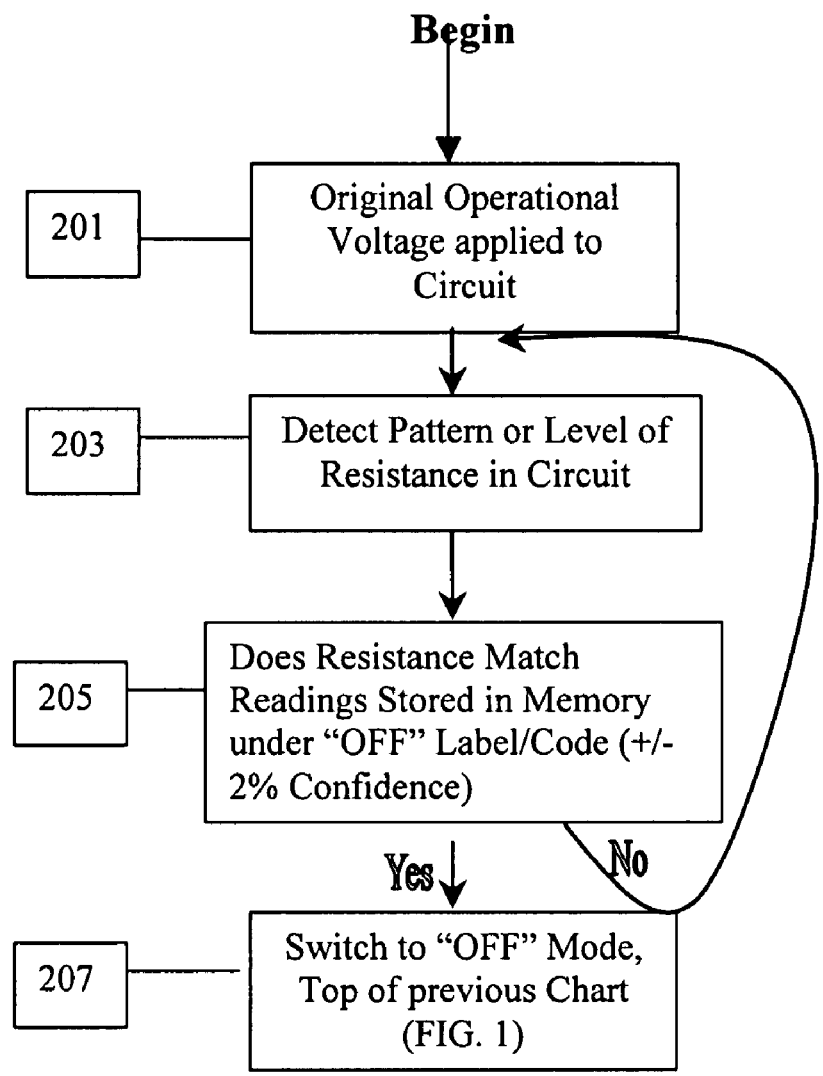
FIG. 2 is a diagram illustrating additional exemplary programming and methodology for a programmable unit of a preferred embodiment of the invention, for a mode in which the original operational voltage is applied to an appliance.

FIG. 2 is a diagram illustrating additional exemplary programming and methodology for a programmable unit of a preferred embodiment of the invention, for a mode in which the original operational voltage is applied to an appliance, and the programming unit has recorded levels or patterns of the appliance in the off position, as in the methodology set forth in FIG. 1. In step 201, the original operational voltage is applied to the appliance. The programming unit then proceeds to step 203, where the programming unit detects, with a sensor, the present level or pattern of resistance of the appliance. For many appliances, the characteristic level or pattern of resistance will be equivalent, within a confidence interval, across a range of voltages. This principal is well known within the art, and expressed under the common formula V=IR, where the resistance (R) may be constant while voltage (V) will alter the level of current only (I). In step 205, the programming unit then proceeds to compare the present level or pattern of resistance of the appliance with levels or patterns of resistance recorded in the memory unit during step 107 of FIG. 1. Once again, it is within the scope of this invention that a certain confidence interval with respect to the amount of difference between the present levels or patterns of resistance and those recorded in memory during step 107 before the two comparators will be found to match, under step 205. That confidence interval may be variably set by the user according to the user's experience with the effectiveness of particular confidence intervals with respect to identifying when the appliance is in the off position. It is also within the scope of this invention that such a confidence interval may be set by the user. Such a confidence interval may be set by establishing minimum or maximum levels of electrical power drawn by the appliance, resistance of the appliance or current passing through the appliance/outlet circuit after which a match will be determined. If, in step 205, the programming unit determines that the present level or pattern of resistance of the appliance matches levels or patterns of resistance recorded in the memory unit during step 107 of FIG. 1, the programming unit proceeds to step 207, in which the programming unit discontinues application of the original operational voltage to the appliance, and applies a selected voltage below the original operational voltage to the circuit, and then proceeds to step 101 of FIG. 1. Step 207 may be accomplished by the programming unit sending a signal to a relay or set of relays connected to the appliance/outlet circuit.

Figure 3:
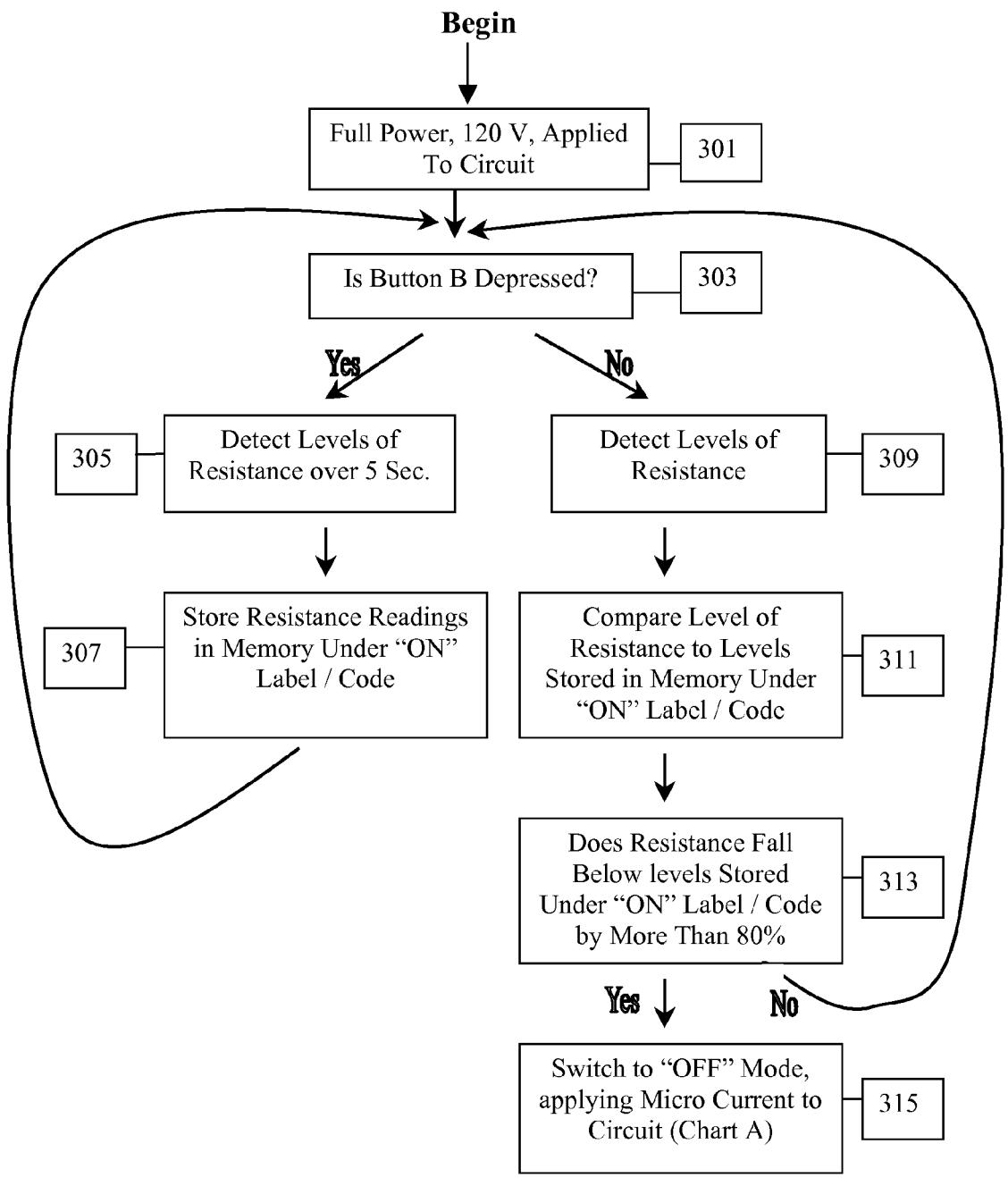
FIG. 3 is a diagram illustrating additional exemplary programming and methodology for a programmable unit of a preferred embodiment of the invention, for a mode in which the original operational voltage is applied to an appliance, and illustrating additional programming by the user.

FIG. 3 is a diagram illustrating additional exemplary programming and methodology for a programmable unit of a preferred embodiment of the invention, for a mode in which the original operational voltage is applied to an appliance, and illustrating additional programming by the user. In step 301, the original operational voltage is applied to the appliance. The programming unit then proceeds to step 303, in which it determines whether the user has depressed button B, which indicates to the programming unit that the user intends to indicate that the appliance is in the on position. If the programming unit determines that button B is depressed, the programming unit proceeds to step 305. In step 305, the programming unit detects with a sensor either the average level of power or pattern of power over a set time interval, shown as 5 seconds in FIG. 3. Similarly, the programming unit may detect the levels or patterns of electrical resistance of the appliance or current passing through the appliance/outlet circuit. In step 307, the programming unit then records the average level or the pattern of power, electrical resistance of the appliance, or current through the appliance/outlet circuit in a memory unit, under a code identifying those recordings as recordings of the electrical characteristics of the appliance in the on position. The programming unit then returns to step 303. If, at step 303, the programming unit determines that button B is not depressed, the programming unit then proceeds to step 309. In step 309, the programming unit detects the present level or pattern of power, electrical resistance of the appliance, or current through the appliance/outlet circuit, using a sensor, over a particular interval. In step 311, the programming unit compares the present level or pattern of power, electrical resistance of the appliance, or current through the appliance/outlet circuit with the average level or the pattern of power, electrical resistance of the appliance, or current through the appliance/outlet circuit recorded in the memory unit under a code identifying those recordings as recordings of the electrical characteristics of the appliance in the on position. In step 313, the programming unit determines whether the present level or pattern of power, electrical resistance of the appliance, or current through the appliance/outlet circuit matches (which match may be determined by a confidence interval which may be variably set by the user) the average level or pattern of power, electrical resistance of the appliance, or current through the appliance/outlet circuit recorded in the memory unit under a code identifying those recordings as recordings of the electrical characteristics of the appliance in the on position. If so, the programming unit returns to Step 303. If not, the programming unit proceeds to step 315, in which the programming unit discontinues application of the original operational voltage to the appliance and applies a selected voltage below the original operational voltage to the appliance, proceeding to step 101 of FIG. 1.

Figure 4:
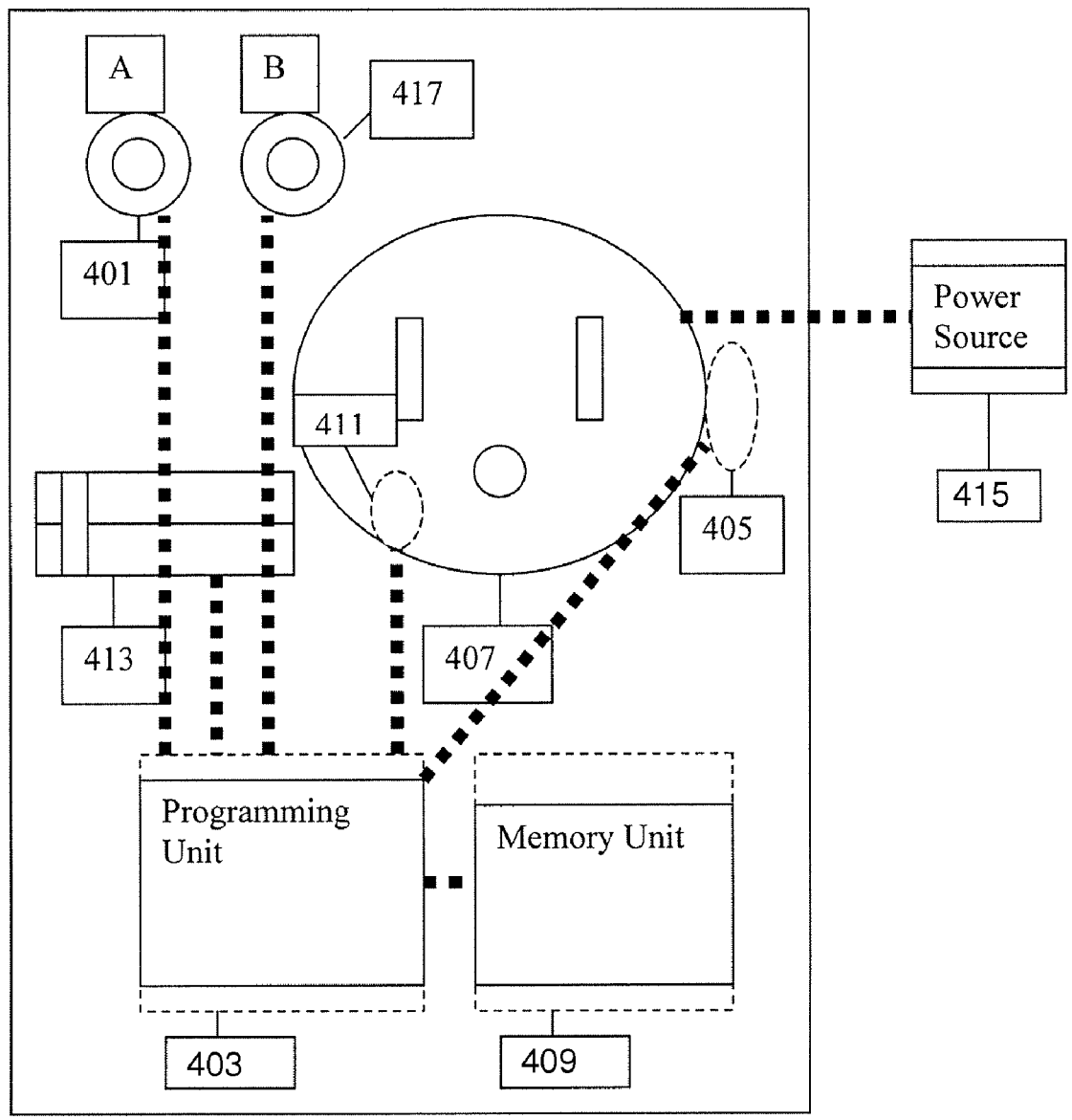
FIG. 4 is a diagram illustrating an exemplary system for performing the present techniques according to an embodiment of the present invention.

FIG. 4 is a diagram illustrating an exemplary system for performing the present techniques according to an embodiment of the present invention. A user-depressible button A 401 allows the user to indicate to the programming unit 403 when the appliance is in the off position, at which time the programming unit 403 detects by connection to a sensor 405 levels or patterns of electrical power, resistance or current delivered in the circuit to an appliance via the outlet 407, according to aspects of the present invention. The programming unit 403 is also connected to a memory unit 409, which enables the programming unit to record levels or patterns of electrical power, resistance or current under identifiable codes, according to the aspects of this invention. The programming unit is also connected to a relay 411, which may switch the voltage between the original operational voltage and the selected voltage below the original operational voltage. A selector 413 connected to the programming unit 403 may be used to set any confidence intervals discussed in this specification and/or the selected voltage below the original operational voltage. A power source 415 enables the invention to provide power to the appliance. Finally, a button B 417 connected to the programming unit 403 permits the user to indicate when the appliance is in the on position, and the programming unit 403 may then also record levels or patterns of electrical power, resistance or current under identifiable codes, according to the aspects of this invention.

It is within the scope of this invention that solid-state circuitry may also be utilized to accomplish some of the objectives of this invention. For example, a variably-set (by the user) reverse-oriented circuit breaker could cause an outlet to cease delivering power below certain pre-determined power levels, which may be set by the user as corresponding to the level of power consumption by the appliance in the off position. Magnets may be interposed for the circuit to test the level of resistance and potential current of the appliance at that point to determine whether the appliance is being returned to the on position, at which time the circuit breaker may re-close according to other aspects of this invention.

I claim:

1. An apparatus, comprising:
a memory device configured to store instructions associated with an application program; and
a processing device that, in response to executing the instructions stored in the memory device, is configured to:
monitor, at a power source, a current power state indicator associated with a current power state of an electrical device to determine the current power state of the electrical device; and
modify a power supply to the electrical device based on the current power state, wherein the power supply maintains a positive power output.

2. The apparatus of claim 1, wherein the power source is an electrical outlet.

3. The apparatus of claim 1, wherein the processing device is further configured to reduce the power supply to the electrical device based on the power state.

4. The apparatus of claim 1, wherein the processing device is further configured to increase the power supply to the electrical device based on the power state.

5. The apparatus of claim 1, wherein the current power state indicator is associated with an indication that the electrical device is in an "on," "off" or "low" power state.

6. The apparatus of claim 5, wherein the current power state indicator is associated with an input for activating the "on," "off" or "low" power state in the electrical device.

7. The apparatus of claim 1, wherein the processing device is further configured to compare the current power state indicator to a threshold power state indicator to determine the current power state of the electrical device.

8. The apparatus of claim 7, wherein:
the current power state indicator corresponds to a first power level, a first voltage, a first current or a first resistance, or any combination thereof associated with the electrical device; and
the threshold power state indicator corresponds to a second power level, a second voltage, a second current or a second resistance, or any combination thereof associated with the electrical device.

9. The apparatus of claim 8, wherein the threshold power state indicator corresponds to a predefined power state of the electrical device.

10. The apparatus of claim 7, wherein:
the current power state indicator corresponds to a first pattern of power levels, a first pattern of voltages, a first pattern of currents or a first pattern of resistance, or any combination thereof associated with the electrical device; and
the threshold power state indicator corresponds to a second pattern of power levels, a second pattern of voltages, a second pattern of currents or a second pattern of resistance, or any combination thereof associated with the electrical device.

11. The apparatus of claim 10, wherein the threshold power state indicator corresponds to a predefined power state of the electrical device.

12. The apparatus of claim 1, wherein the processing device is further configured to:
receive an indication that the electrical device is in a particular power state; and
detect a power consumption metric identifying the particular power state of the electrical device.

13. The apparatus of claim 12, wherein the processing device is further configured to:
store the power consumption metric as a threshold power state indicator; and
compare the current power state indicator with the threshold power state indicator to determine the current power state of the electrical device.

14. A method comprising:
monitoring, by a processing device, a current power state indicator associated with a current power state of an electrical device;
determining, by the processing device, the current power state of the electrical device based on the current power state indicator; and
changing, by the processing device, a power supply to the electrical device based on the current power state, wherein the power supply maintains a positive average power output.

15. The method of claim 14, wherein a power supply source is an electrical outlet.

16. The method of claim 14, further comprising reducing, by the processing device, the power supply to the electrical device based on the power state.

17. The method of claim 14, further comprising increasing, by the processing device, the power supply to the electrical device based on the power state.

18. The method of claim 14, wherein the current power state indicator is associated with an indication that the electrical device is in an "on," "off" or "low" power state.

19. The method of claim 18, wherein the current power state indicator is associated with an input for activating the "on," "off" or "low" power state in the electrical device.

20. The method of claim 14, further comprising comparing, by the processing device, the current power state indicator to a threshold power state indicator to determine the current power state of the electrical device.

21. The method of claim 20, wherein:
the current power state indicator corresponds to a first power level, a first voltage, a first current or a first resistance, or any combination thereof associated with the electrical device; and
the threshold power state indicator corresponds to a second power level, a second voltage, a second current or a second resistance, or any combination thereof associated with the electrical device.

22. The method of claim 21, wherein the threshold power state indicator corresponds to a predefined power state of the electrical device.

23. The method of claim 20, wherein:
the current power state indicator corresponds to a first pattern of power levels, a first pattern of voltages, a first pattern of currents or a first pattern of resistance, or any combination thereof associated with the electrical device; and
the threshold power state indicator corresponds to a second pattern of power levels, a second pattern of voltages, a second pattern of currents or a second pattern of resistance, or any combination thereof associated with the electrical device.

24. The method of claim 23, wherein the threshold power state indicator corresponds to a predefined power state of the electrical device.

25. The method of claim 14, further comprising:
receiving, by the processing device, an indication that the electrical device is in a particular power state; and detecting, by the processing device, a power consumption metric identifying the particular power state of the electrical device.

26. The method of claim 25, further comprising:
storing, by the processing device, the power consumption metric as a threshold power state indicator; and
comparing, by the processing device, the current power state indicator with the threshold power state indicator to determine the current power state of the electrical device.

27. A computer-readable memory device having instructions stored thereon that, in response to execution by a processing device, cause the processing device to perform operations comprising:
monitoring a current power state indicator associated with a current power state of an electrical device;
determining the current power state of the electrical device based on the current power state indicator; and
regulating a power supply maintaining a positive power output to the electrical device based on the current power state.

28. The computer-readable memory device of claim 27, wherein a power supply source is an electrical outlet.

29. The computer-readable memory device of claim 27, wherein the operations further comprise reducing the power supply to the electrical device based on the power state.

30. The computer-readable memory device of claim 27, wherein the operations further comprise increasing the power supply to the electrical device based on the power state.

31. The computer-readable memory device of claim 27, wherein the current power state indicator is associated with an indication that the electrical device is in an "on," "off" or "low" power state.

32. The computer-readable memory device of claim 31, wherein the current power state indicator is associated with an input for activating the "on," "off" or "low" power state in the electrical device.

33. The computer-readable memory device of claim 27, wherein the operations further comprise comparing the current power state indicator to a threshold power state indicator to determine the current power state of the electrical device.

34. The computer-readable memory device of claim 33, wherein:
the current power state indicator corresponds to a first power level, a first voltage, a first current or a first resistance, or any combination thereof associated with the electrical device; and
the threshold power state indicator corresponds to a second power level, a second voltage, a second current or a second resistance, or any combination thereof associated with the electrical device.

35. The computer-readable memory device of claim 34, wherein the threshold power state indicator corresponds to a predefined power state of the electrical device.

36. The computer-readable memory device of claim 33, wherein:
the current power state indicator corresponds to a first pattern of power levels, a first pattern of voltages, a first pattern of currents or a first pattern of resistance, or any combination thereof associated with the electrical device; and
the threshold power state indicator corresponds to a second pattern of power levels, a second pattern of voltages, a second pattern of currents or a second pattern of resistance, or any combination thereof associated with the electrical device.

37. The computer-readable memory device of claim 36, wherein the threshold power state indicator corresponds to a predefined power state of the electrical device.

38. The computer-readable memory device of claim 27, wherein the operations further comprise:
receiving an indication that the electrical device is in a particular power state; and
detecting a power consumption metric identifying the particular power state of the electrical device.

39. The computer-readable memory device of claim 38, wherein the operations further comprise:
storing the power consumption metric as a threshold power state indicator; and
comparing the current power state indicator with the threshold power state indicator to determine the current power state of the electrical device.

40. An apparatus comprising:
means for monitoring a current power state indicator associated with a current power state of an electrical device;
means for determining the current power state of the electrical device based on the current power state indicator; and
means for modifying a power supply to the electrical device based on the current power state, wherein the modified power supply continues a positive power output.

41. The apparatus of claim 40, wherein a power supply source is an electrical outlet.

42. The apparatus of claim 40, further comprising means for reducing the power supply to the electrical device based on the power state.

43. The apparatus of claim 40, further comprising means for increasing the power supply to the electrical device based on the power state.

44. The apparatus of claim 40, wherein the current power state indicator is associated with an indication that the electrical device is in an "on," "off" or "low" power state.

45. The apparatus of claim 44, wherein the current power state indicator is associated with an input for activating the "on," "off" or "low" power state in the electrical device.

46. The apparatus of claim 40, further comprising means for comparing the current power state indicator to a threshold power state indicator to determine the current power state of the electrical device.

47. The apparatus of claim 46, wherein:
the current power state indicator corresponds to a first power level, a first voltage, a first current or a first resistance, or any combination thereof associated with the electrical device; and
the threshold power state indicator corresponds to a second power level, a second voltage, a second current or a second resistance, or any combination thereof associated with the electrical device.

48. The apparatus of claim 47, wherein the threshold power state indicator corresponds to a predefined power state of the electrical device.

49. The apparatus of claim 46, wherein:
the current power state indicator corresponds to a first pattern of power levels, a first pattern of voltages, a first pattern of currents or a first pattern of resistance, or any combination thereof associated with the electrical device; and
the threshold power state indicator corresponds to a second pattern of power levels, a second pattern of voltages, a second pattern of currents or a second pattern of resistance, or any combination thereof associated with the electrical device.

50. The apparatus of claim 49, wherein the threshold power state indicator corresponds to a predefined power state of the electrical device.

51. The apparatus of claim 40, further comprising:
means for receiving an indication that the electrical device is in a particular power state; and
means for detecting a power consumption metric identifying the particular power state of the electrical device.

52. The apparatus of claim 51, further comprising:
means for storing the power consumption metric as a threshold power state indicator; and
means for comparing the current power state indicator with the threshold power state indicator to determine the current power state of the electrical device.

* * * * *